(12) United States Patent
Emilsson

(10) Patent No.: US 6,264,074 B1
(45) Date of Patent: Jul. 24, 2001

(54) MOUTHPIECE FOR THE FEEDING OF CHILDREN FROM A COMPRESSIBLE E.G. TUBE-LIKE CONTAINER

(75) Inventor: Bjorn Emilsson, Myrullveien 20, N-4353, Klepp St. (NO)

(73) Assignees: Bjorn Emilsson; Jan Berge, both of (NO)

( * ) Notice: Subject to any disclaimer, the term of this patent is extended or adjusted under 35 U.S.C. 154(b) by 0 days.

(21) Appl. No.: 09/462,986

(22) PCT Filed: Jul. 9, 1998

(86) PCT No.: PCT/NO98/00209

§ 371 Date: Jan. 18, 2000

§ 102(e) Date: Jan. 18, 2000

(87) PCT Pub. No.: WO99/03441

PCT Pub. Date: Jan. 28, 1999

(30) Foreign Application Priority Data

Jul. 18, 1997 (NR) .......................................... 973318

(51) Int. Cl.[7] .................. B67D 3/06; B67D 5/06; B67D 1/07; A47J 43/28

(52) U.S. Cl. .................... 222/527; 222/205; 222/192; 30/141

(58) Field of Search .................... 222/205, 527, 222/192; 30/123.3, 125, 141

(56) References Cited

U.S. PATENT DOCUMENTS

| 3,104,032 | 9/1963 | Hansen | 222/91 |
| 3,116,152 | * 12/1963 | Smith | 30/141 |
| 3,133,679 | 5/1964 | Brown | 222/205 |
| 3,259,132 | 7/1966 | Katter | 128/344 |
| 3,383,018 | * 5/1968 | Grimsley | 222/205 |
| 3,473,221 | 10/1969 | Flanders | 30/141 |
| 5,269,445 | * 12/1993 | Tobler | 222/527 |

FOREIGN PATENT DOCUMENTS

| 2258164 | 1/1974 | (FR) . |
| 2697331 | 10/1992 | (FR) . |
| WO 80/02875 | 6/1980 | (WO) . |

* cited by examiner

*Primary Examiner*—Kevin Shaver
*Assistant Examiner*—Stephanie L. Willatt
(74) *Attorney, Agent, or Firm*—Knobbe, Martens Olson & Bear, LLP

(57) ABSTRACT

A mouthpiece for feeding food from a compressible container is provided. The mouthpiece comprises a concave blade and a diaphragm attached along its edge to the blade, thereby covering the concave blade. The diaphragm has a free portion which, together with a substantially opposing blade end, defines an opening, which food can pass through. The mouthpiece is adapted to be attached to an aperture portion of a container.

5 Claims, 3 Drawing Sheets

MOUTHPIECE FOR THE FEEDING OF CHILDREN FROM A COMPRESSIBLE E.G. TUBE-LIKE CONTAINER

BACKGROUND OF THE INVENTION

FIELD OF THE INVENTION

This invention relates to a mouthpiece for the feeding of especially small children with food from a tube filled with a nutrient exhibiting such a consistence and nature that can be squeezed out from the aperture portion of the tube, at which the mouthpiece is placed or can be placed prior to the feeding procedure.

SUMMARY OF THE INVENTION

The main object of the invention has been to provide a feeding device for food contained in a tube, wherein soiling is substantially reduced in relation to feeding from a bowl, using a child's spoon.

In accordance with the present invention, this object has been achieved through shaping and designing the tube mouthpiece such that it exhibits the features as defined in the characterizing clause of claim 1. The mouthpiece may constitute a sort of permanent, screwed on hood following the tube, said hood being surrounded by an external closure hood; or the mouthpiece may constitute an additional equipment to be screwed or pushed onto the aperture portion of the tube subsequently to the removal of an ordinary closure hood.

Food for small children in finely powdered condition, suitable to be contained within and fed out from a tube, is packed in e.g. 125 grams tubes, such as the conventional metal tubes used for mayonnaise, caviare, etc.

On the aperture portion is attached a feeding mouthpiece according to the invention having a shape substantially corresponding to a table spoon blade, the axially outer portion thereof being free and uncovered, while the remaining, axially inner blade portion is assigned an opposing diaphragm having an outer, free edge portion positioned adjacent the spoon blade tip, but spaced therefrom in the axial direction. This diaphragm which is connected to the mouthpiece body at the axially inner edge portion thereof, may consist of a soft plastic material. Approximately two third of the axial length extent of the table spoon blade are covered by the soft diaphragm.

The diaphragm and its mounting in relation to the table spoon blade counteract soiling during the feeding of a smaller child.

When one squeezes the rear portion of the tube, the mashed food is urged forwardly, out through the aperture portion of the tube where a "mouthful" of food lands on the table spoon tip, the upwardly concave depression cavity being filled with food, so that the diaphragm is stretched and takes an upwardly convexly curved shape.

When the table spoon blade in this condition is passed into the mouth of a child, the diaphragm prevents the upper lip of the child from coming down into the food in the axially inner portion of the table spoon blade in relation to the tube. Such food-lip-contact will ordinarily occur when a child is fed by means of a common spoon, and this is the most frequent reason to soiling.

When the table spoon blade filled with food and partially covered by the diaphragm has come into the child's mouth, its upper lip will now be capable of squeezing the distended diaphragm, so that the food below the compressed diaphragm is pressed forwardly and, thus, onto the table spoon blade tip, from where the food will land in the oral cavity of the child. When the table spoon blade is in the process of being withdrawn, the upper lip of the child will retain the food remaining on the uncovered table spoon blade tip. Now, the child has received a portion of food, which can be controlled by exerting a larger or a smaller pressure on the rear portion of the tube.

The tube with its nutrient content may be heatable in a micro wave oven, or through the use of a water bath, while some nutrients do not require any heating; room temperature being sufficient.

BRIEF DESCRIPTION OF THE DRAWINGS

Non-restricting, preferred exemplary embodiments are further explained in the following, reference being made to the accompanying drawings, wherein.

DETAILED DESCRIPTION OF THE PREFERRED EMBODIMENT

Figure 1:
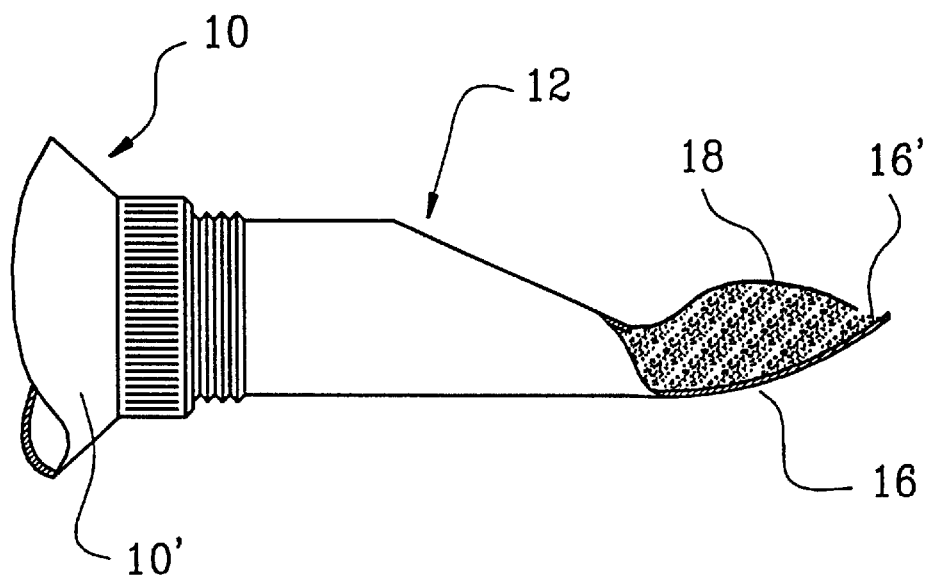
FIG. 1 shows a mouthpiece for a tube containing food for small children, as seen in a side elevational view and in an axial section through the table spoon blade and the diaphragm partially covering the spoon blade, in a condition in which the table spoon blade is filled with food which has forced the diaphragm upwardly, so that it takes a convexly curved position.

A tube 10 has an ordinary aperture or mouth portion 10', onto which a mouthpiece 12 is placed or adapted to be placed by means of threads or through a press fit. The connection of the mouthpiece 12 to the aperture portion 10' of the tube 10 may also take place through the intermediary of a spatially elastically deformable/resiliently rebounding, annular or sleeve-shaped connection portion 14 permitting the longitudinal axis of the mouthpiece 12 to form an acute angle with the longitudinal axis of the tube 10.

The axially outer end part of the mouthpiece 12 comprises a lower table spoon blade 16, referred to the position of use, said blade across the axially inner portion thereof being covered by a flexible diaphragm 18, so that a free blade tip portion 16' is formed.

The part of the mouthpiece 12 positioned axially spaced rearwardly from the tip, tapers conically in direction of its outer, free end where spoon blade 16 and opposing diaphragm 18 are joined.

As a sale object, such a tube 10 having a mouthpiece 12 elastically attached thereto may have a closure hood or cap (not shown) which, preferably, is screwed or pushed firmly onto a circle-cylindrical tubs portion 10″.

Figure 2:
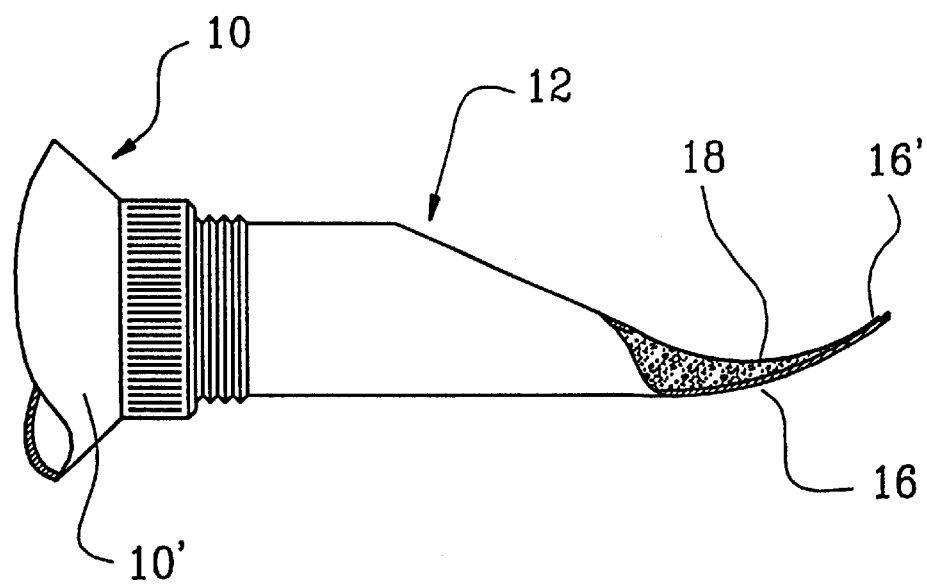
FIG. 2 corresponds to FIG. 1, but here the table spoon blade has been emptied through the diaphragms compression by means of the child's upper lip.
Figure 3:
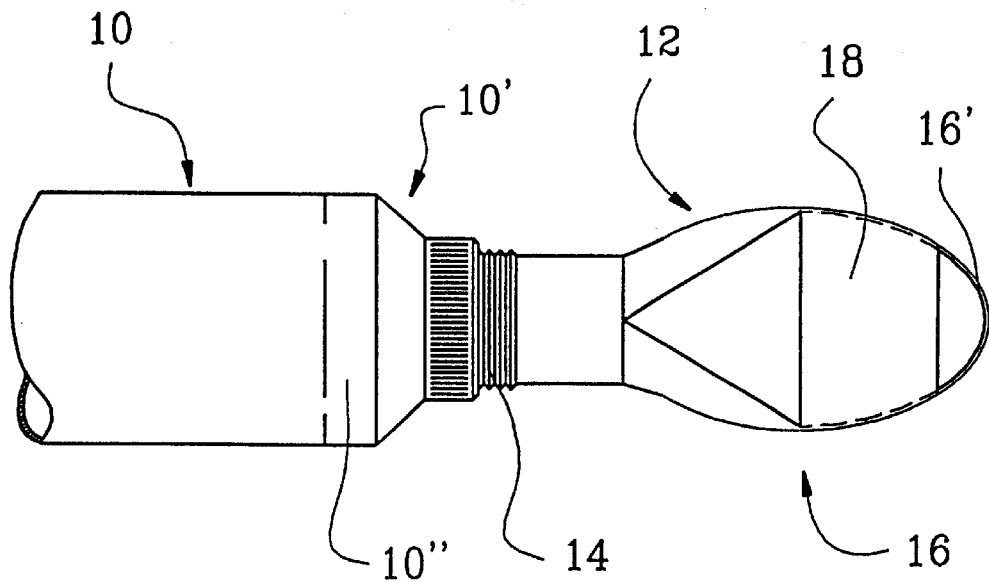
FIG. 3 is a side elevational view of a food tube's front portion, where a mouthpiece according to the invention has been illustrated as seen in a direction perpendicularly to the depression cavity of the table spoon blade.
Figure 4:
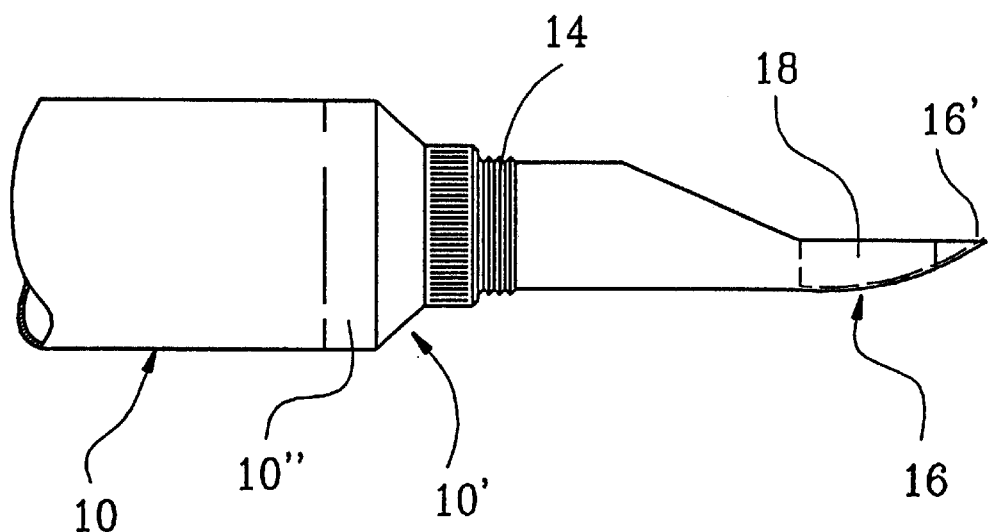
FIG. 4 is a side elevational view corresponding to FIG. 3, turned 90° in relation to FIG. 3 about the longitudinal axis of the tube.
Figure 5:
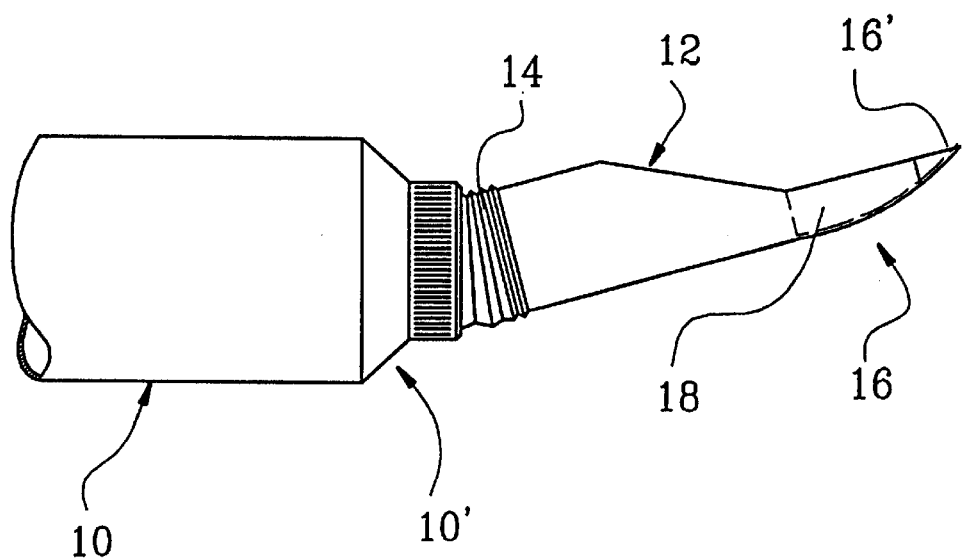
FIG. 5 corresponds to FIG. 4, but here the mouthpiece is connected to the tube mouth portion through an elastically compliant/resiliently rebounding, annular/sleeve-shaped connecting member permitting the symmetry axis of the mouthpiece to form an angle with the longitudinal axis of the tube.
Figure 6:
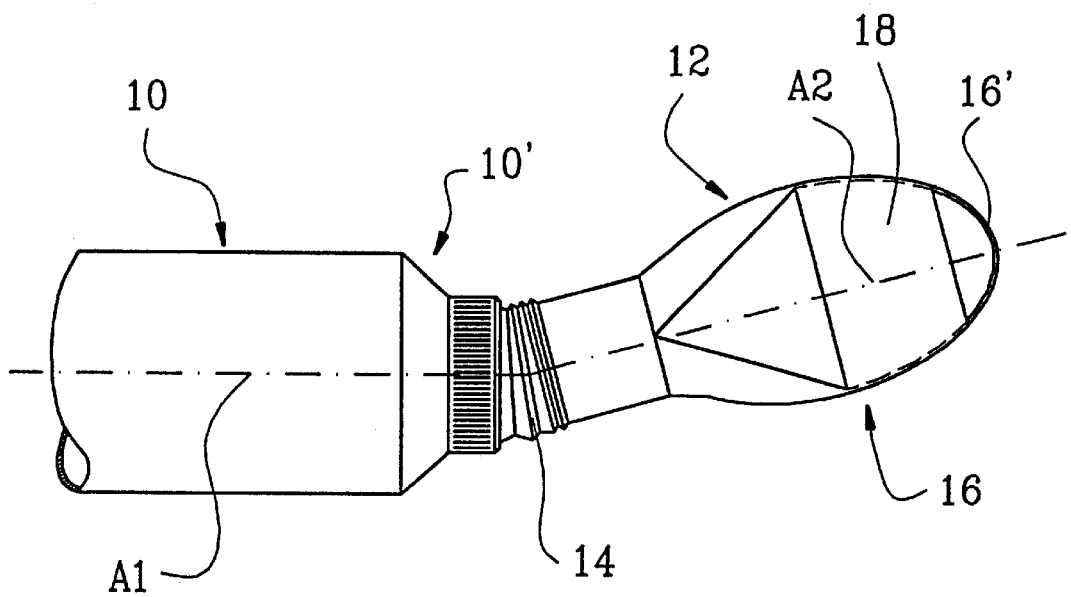
FIG. 6 corresponds to FIG. 5, turned 90° in relation to FIG. 5.

FIGS. 1 and 2 illustrate the function of the mouthpiece 12 in connection with the tube 10 which may contain a mashed nutrient for small children, well suited to be stored and especially fit to be pressed out from the tube in an even and controlled way.

Thus, when pressure is exerted on the tube 10, the mashed food is forced forwardly until a certain amount of food fills the table spoon blade 16, so that the diaphragm 18 is stretched and distended, such as shown in FIG. 1.

When the table spoon blade in this condition is passed into the mouth of the child, the diaphragm 18 prevents the upper lip of the child from coming into contact with the food before the outer portion of table spoon blade, bringing with it food, has arrived within the oral cavity of the child. Then, the child has the opportunity of exerting a pressure with its upper lip against the diaphragm. The food on the spoon blade portion beneath the diaphragm 18 is, thus, pressed forwardly so that it is transferred to the spoon blade tip 16′ and, from there, into the oral cavity of the child.

When the table spoon blade 16 in nearly emptied condition is in the process of being withdrawn from the child's mouth, the child's upper lip will retain the food remaining on the uncovered spoon blade tip 16′. The amount of food received by the child each and every time in this way can be varied by changing the pressure on the tube. One tube is content of food may correspond to one meal or, possibly, to more than one meal.

By using a mouthpiece in accordance with the invention, feeding may take place without any soiling, simultaneously as the child becomes used to eat by means of a spoon.

What is claimed is:

1. A mouthpiece for feeding food from a compressible container, the mouthpiece comprising a concave blade and a diaphragm attached along its edge to the blade, thereby covering the concave blade, the diaphragm having a free portion which, together with a substantially opposing blade end, defines an opening, which food can pass through, the mouthpiece being adapted to be attached to an aperture portion of a container.

2. The mouthpiece as defined in claim 1, wherein the blade is shaped like a table spoon blade.

3. The mouthpiece as defined in claim 1, wherein the mouthpiece comprises a flexible, annular piece configured to couple with the aperture portion of the container.

4. The mouthpiece as defined in claim 1, wherein the mouthpiece is assigned an external protection hood or cap.

5. The mouthpiece as defined in claim 1, wherein the free portion of the diaphragm is withdrawn in relation to the blade end.

* * * * *